United States Patent
James et al.

(10) Patent No.: US 9,884,631 B2
(45) Date of Patent: Feb. 6, 2018

(54) TRANSITIONING BETWEEN OPERATIONAL MODES OF AN AUTONOMOUS VEHICLE

(71) Applicants: Toyota Motor Engineering & Manufacturing North America, Inc., Erlanger, KY (US); Toyota Jidosha Kabushiki Kaisha, Toyota-shi (JP)

(72) Inventors: Michael R. James, Northville, MI (US); Katsuhiro Sakai, Ann Arbor, MI (US); Toshiki Kindo, Yokohama (JP); Danil V. Prokhorov, Canton, MI (US); Masahiro Harada, Novi, MI (US)

(73) Assignees: Toyota Motor Engineering & Manufacturing North America, Inc., Erlanger, KY (US); Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 40 days.

(21) Appl. No.: 14/730,570

(22) Filed: Jun. 4, 2015

(65) Prior Publication Data
US 2016/0355192 A1    Dec. 8, 2016

(51) Int. Cl.
*B60W 50/08*    (2012.01)
*B60W 50/14*    (2012.01)
(Continued)

(52) U.S. Cl.
CPC ........... *B60W 50/082* (2013.01); *B60R 11/04* (2013.01); *B60W 40/08* (2013.01); *B60W 50/14* (2013.01);
(Continued)

(58) Field of Classification Search
CPC .......... G05D 1/00; G05D 1/02; G05D 1/0088; G05D 1/0289; G05D 1/0259;
(Continued)

(56) References Cited

U.S. PATENT DOCUMENTS 4,346,365 A * 8/1982 Ingram ............... B60Q 1/46
                                              340/471
5,877,897 A * 3/1999 Schofield ............ H04N 7/183
                                              348/E7.086

(Continued)

OTHER PUBLICATIONS

National Highway Traffic Safety Administration; "U.S. Department of Transportation Releases Policy on Automated Vehicle Development"; May 30, 2013; [retrieved Jun. 3, 2015]; retrieved from the Internet: <http://www.nhtsa.gov/About+NHTSA/Press+Releases/U.S.+Department+of+Transportation+Releases+Policy+on+Automated+Vehicle+Development> (2 pages).
National Highway Traffic Safety Administration; "National Highway Traffic Safety Administration Preliminary Statement of Policy Concerning Automated Vehicles"; 2013; (14 pages).

(Continued)

*Primary Examiner* — Yonel Beaulieu
*Assistant Examiner* — Martin Weeks
(74) *Attorney, Agent, or Firm* — Christopher G. Darrow; Darrow Mustafa PC

(57) ABSTRACT

Arrangements relating to the transitioning of a vehicle between operational modes are described. The vehicle can transition between a first operational mode and a second operational mode. The second operational mode has a greater degree of manual involvement than the first operational mode. For instance, the first operational mode can be an unmonitored autonomous operational mode, and the second operational mode can be a monitored autonomous operational mode or a manual operational mode. It can be determined whether an operational mode transition event has occurred while the vehicle is operating in the first operational mode. In response to determining that an operational mode transition event has occurred, a time buffer for continuing in the first operational mode before switching to the second operational mode can be determined. A transition alert can be presented within the vehicle. The transition alert can represent the determined time buffer.

23 Claims, 3 Drawing Sheets

(51) Int. Cl.
*B60R 11/04* (2006.01)
*B60W 50/16* (2012.01)
*B60W 40/08* (2012.01)

(52) U.S. Cl.
CPC ..... *B60W 50/16* (2013.01); *B60W 2040/0818* (2013.01); *B60W 2050/143* (2013.01); *B60W 2050/146* (2013.01); *B60W 2420/42* (2013.01); *B60W 2540/04* (2013.01); *B60W 2550/402* (2013.01)

(58) Field of Classification Search
CPC .... G05D 1/0246; G05D 1/088; G05D 1/0061; B60W 50/08; B60W 50/14; B60W 50/16; B60W 40/08; B60W 2050/146; B60R 11/04
See application file for complete search history.

(56) References Cited

U.S. PATENT DOCUMENTS

| | | |
|---|---|---|
| 8,618,922 B2 | 12/2013 | Debouk et al. |
| 2013/0131907 A1 | 5/2013 | Green et al. |
| 2014/0244096 A1 | 8/2014 | An et al. |
| 2014/0303827 A1 | 10/2014 | Dolgov et al. |
| 2016/0357186 A1* | 12/2016 | Dias ..................... G05D 1/0061 |

OTHER PUBLICATIONS

Kamata; "Background Map Format for Autonomous Driving"; U.S. Appl. No. 14/574,151, filed Dec. 17, 2014.

* cited by examiner

TRANSITIONING BETWEEN OPERATIONAL MODES OF AN AUTONOMOUS VEHICLE

FIELD

The subject matter described herein relates in general to vehicles that have a plurality of operational modes including an autonomous operational mode and, more particularly, to the transitioning between different operational modes.

BACKGROUND

Some vehicles are configured to operate in a plurality of operational modes. An example of an operational mode is one in which a computing system is used to navigate and/or maneuver the vehicle along a travel route with minimal or no input from a human driver. Such vehicles are equipped with sensors that are configured to detect information about the surrounding environment, including the presence of objects in the environment. The detected information can be sent to the computing system. Other operational modes can include different levels of human input, including a manual mode in which a human driver is responsible for navigating and/or maneuvering the vehicle through the surrounding environment. Vehicles with a plurality of operational modes are configured to allow switching between the various operational modes.

SUMMARY

In one respect, the present disclosure is directed to a method of transitioning a vehicle between a first operational mode and a second operational mode. The second operational mode has a greater degree of manual involvement than the first operational mode. The method can include determining whether an operational mode transition event has occurred while the vehicle is operating in the first operational mode. The method can also include, responsive to determining that an operational mode transition event has occurred, determining a time buffer for continuing in the first operational mode before switching to the second operational mode. The method can further include presenting a transition alert within the vehicle. The transition alert can correspond to the determined time buffer.

In another respect, the present disclosure is directed to a system for transitioning a vehicle between a first operational mode and a second operational mode. The second operational mode has a greater degree of manual involvement than the first operational mode. The system can include a user interface located within the vehicle. The system can also include a processor operatively connected to the sensor system. The processor can be programmed to initiate executable operations. The executable operations can include determining whether an operational mode transition event has occurred while the vehicle is operating in the first operational mode. The executable operations can also include, responsive to determining that an operational mode transition event has occurred, determining a time buffer for continuing in the first operational mode before switching to the second operational mode. The executable operations can further include presenting a transition alert within the vehicle, the transition alert corresponding to the determined time buffer.

DETAILED DESCRIPTION

Figure 1:
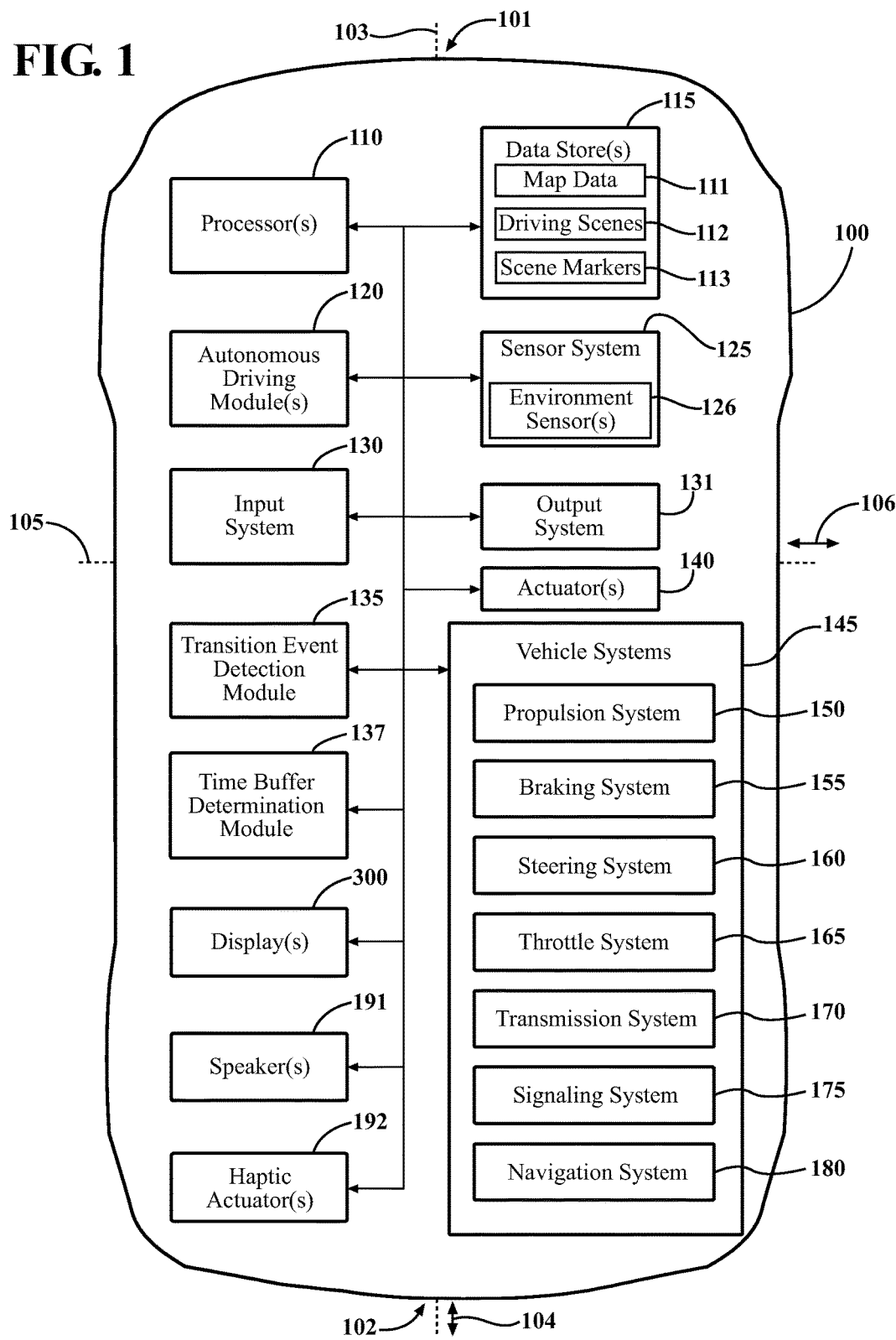
FIG. 1 is an example of an autonomous vehicle configured to transition between different operational modes.

This detailed description relates to the transitioning of an autonomous vehicle from a first operational mode to a second operational mode. This detailed description is more particularly related to instances in which the second operational mode has a greater degree of manual involvement than the first operational mode. In response to determining that an operational mode transition event has occurred, a time buffer for continuing in the first operational mode before switching to the second operational mode can be determined. A transition alert corresponding to the determined time buffer can be presented. The present detailed description relates to systems, methods and computer program products that incorporate such features. In at least some instances, such systems, methods and computer program products can improve performance and/or safety of an autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft or any other form of motorized transport.

According to arrangements herein, the vehicle 100 can be an autonomous vehicle. As used herein, "autonomous vehicle" means a vehicle that configured to operate in an autonomous mode. "Autonomous mode" means that one or more computing systems are used to navigate and/or maneuver the vehicle along a travel route with minimal or no input from a human driver. In one or more arrangements, the vehicle 100 can be highly automated.

The vehicle 100 can have a plurality of operational modes. For instance, the vehicle 100 can have an unmonitored autonomous operational mode. "Unmonitored autonomous operational mode" means that one or more computing systems are used to navigate and/or maneuver the vehicle along a travel route with no input or supervision required from a human driver. As an example, the unmonitored autonomous operational mode can include Level 4 (L4), as defined by the National Highway Traffic Safety Administration in its Preliminary Statement of Policy Concerning Automated Vehicles (May 30, 2013) ("NHTSA 2013 Policy"), which is incorporated herein by reference. The vehicle 100 can have a monitored autonomous operational mode. "Monitored autonomous operational mode" means that one or more computing systems are used to navigate and/or maneuver the vehicle with at least some human driver supervision required. As an example, the monitored autonomous operational mode can include Level 3 or L3, as defined by the NHTSA 2013 Policy. In some instances, when the vehicle 100 is in a monitored autonomous operational mode, a signal (e.g., an audial signal, a visual signal, a haptic signal, etc.) can be presented to a human driver to take an action within a predetermined amount of time. If such action is not taken within the predetermined amount of time, one or more safety maneuvers can be implemented.

The vehicle 100 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. As an example, the semi-autonomous operational mode can include Levels 2 (L2) and/or Level 1 (L1), as defined by the NHTSA 2013 Policy. One example of a semi-autonomous operational mode is when an adaptive cruise control system is activated. In such case, the speed of a vehicle can be automatically adjusted to maintain a safe distance from a vehicle ahead based on data received from on-board sensors, but the vehicle is otherwise operated manually by a human driver. Upon receiving a driver input to alter the speed of the vehicle (e.g. by depressing the brake pedal to reduce the speed of the vehicle), the adaptive cruise control system is deactivated and the speed of the vehicle is reduced.

The vehicle 100 can have a manual operational mode. "Manual operational mode" means that a substantial majority or all of the navigation and/or maneuvering of the vehicle along a travel route is performed by a human driver with minimal or no input from a computing system. As an example, the manual operational mode can include Level 0 (L0), as defined by the NHTSA 2013 Policy.

The vehicle 100 can have a special operational mode. "Special operational mode" means that, if a requested human driver action is not taken or confirmed within a predetermined amount of time, the navigation and/or maneuvering of the vehicle can be controlled by one or more computing systems to implement one or more safety maneuvers. The safety maneuver can be a predetermined safety maneuver based on the current driving environment. For instance, if a human driver does not take control of the vehicle 100 within a predetermined amount of time, the safety maneuver may include moving the vehicle 100 to the side of the road, moving the vehicle 100 onto the shoulder of the road, reducing the speed of the vehicle 100, turning the vehicle 100 into the nearest parking lot, bringing the vehicle 100 to a stop, keeping the vehicle 100 stopped, or having the vehicle 100 take the next exit on a highway, just to name a few possibilities.

The vehicle 100 can be configured to be switched between the various operational modes. Such switching can be implemented in any suitable manner, now known or later developed. The switching can be performed automatically, or it can be done responsive to receiving a manual input or request. It will be appreciated that the switching between the operational modes can raise concerns about reliable transfer of operational authority.

In one or more arrangements, the switching can be done from a first operational mode to a second operational mode. In some instances, the second operational mode can have a greater degree of manual involvement than the first operational mode. A "greater degree of manual involvement" means that a human driver is required to or should increase his or her level of supervision and/or input with respect to the control of at least the navigation and/or maneuvering of the vehicle. One example of when the second operational mode can have a greater degree of manual involvement than the first operational mode is when the first operational mode is an unmonitored autonomous operational mode and the second operational mode is a monitored autonomous operational mode or a manual operational mode. Another example is when the first operational mode is a monitored operational mode and the second operational mode is a semi-autonomous operational mode or a manual operational mode.

In some instances, the second operational mode can have a lesser degree of manual involvement than the first operational mode. A "lesser degree of manual involvement" means that a human driver can decrease his or her level of supervision and/or input with respect to the control of at least the navigation and/or maneuvering of the vehicle. One example of when the second operational mode can have a lesser degree of manual involvement than the first operational mode is when the first operational mode is a manual operational mode, and the second operational mode is a semi-autonomous operational mode, a monitored autonomous operational mode, or an unmonitored autonomous operational mode. Another example is when the first operational mode is a monitored operational mode, and the second operational mode is an unmonitored operational mode.

The vehicle 100 can have a forward end 101 and a rearward end 102. The vehicle 100 can have an associated longitudinal axis 103, which can be the central axis of the vehicle 100. The vehicle 100 can have an associated longitudinal direction 104. "Longitudinal direction" means any direction that is substantially parallel to and/or co-linear with the longitudinal axis 103. The vehicle 100 can have an associated lateral axis 105, which can be substantially perpendicular to the longitudinal axis 103. As used herein, the term "substantially" includes exactly the term it modifies and slight variations therefrom. Thus, the term "substantially perpendicular" means exactly perpendicular and slight variations therefrom. In this particular example, slight variations therefrom can include within normal manufacturing tolerances, within about 10 degrees or less, within about 5 degrees or less, within about 4 degrees or less, within about 3 degrees or less, within about 2 degrees or less, or within about 1 degree or less. The vehicle 100 can have an associated lateral direction 106. "Lateral direction" means any direction that is substantially parallel to and/or co-linear with the lateral axis 105.

The vehicle 100 can include various elements, some of which may be a part of an autonomous driving system. Some of the possible elements of the vehicle 100 are shown in FIG.

1 and will now be described. It will be understood that it is not necessary for the vehicle 100 to have all of the elements shown in FIG. 1 or described herein. The vehicle 100 can have any combination of the various elements shown in FIG. 1. Further, the vehicle 100 can have additional elements to those shown in FIG. 1. In some arrangements, vehicle 100 may not include one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

The vehicle 100 can include one or more processors 110. "Processor" means any component or group of components that are configured to execute any of the processes described herein or any form of instructions to carry out such processes or cause such processes to be performed. The processor 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 110 can include at least one hardware circuit (e.g., an integrated circuit) configured to carry out instructions contained in program code. In arrangements in which there is a plurality of processors 110, such processors can work independently from each other or one or more processors can work in combination with each other. In one or more arrangements, the processor 110 can be a main processor of the vehicle 100. For instance, the processor 110 can be an engine control unit (ECU).

The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor 110, or the data store 115 can be operatively connected to the processor 110 for use thereby. The term "operatively connected," as used throughout this description, can include direct or indirect connections, including connections without direct physical contact.

In one or more arrangements, the one or more data stores 115 can include map data 111. The map data 111 can include maps of one or more geographic areas or regions. The map data 111 can include information or data on roads, traffic control devices, structures, features, landmarks in the one or more geographic areas. The map data 111 can be in any suitable form. In some instances, the map data 111 can include aerial views of an area. In some instances, the map data 111 can include ground views of an area, including 360 degree ground views. The map data 111 can be highly detailed. In some instances, the map data 111 can be located onboard the vehicle 100. Alternatively, at least a portion of the map data 111 can be located remote from the vehicle 100.

In one or more arrangements, the one or more data stores 115 can include a set of driving scenes 112. The term "set of driving scenes" is defined as one or more driving scenes. "Driving scenes" means sensor system data of a location within a geographic area. As an example, the driving scenes can be images or videos. The driving scenes can include any suitable sensor system data of a road, an intersection, buildings, structures, traffic control devices, lane markers, landmarks, features. In some instances, the set of driving scenes 112 can be located onboard the vehicle 100. Alternatively, at least a portion of the set of driving scenes 112 can be located remote from the vehicle 100.

In one or more arrangements, the one or more data stores 115 can include a set of scene markers 113. The term "set of scene markers" is defined as one or more scene markers. A "scene marker" is an object or feature of interest located in and/or describing a driving scene. Examples of scene markers can include any suitable sensor system data of a road, an intersection, buildings, structures, traffic control devices, lane markers, landmarks, road paint, signs, poles, curbs, features. In some instances, the set of scene markers 113 can be located onboard the vehicle 100. Alternatively, at least a portion of the set of scene markers 113 can be located remote from the vehicle 100.

In one or more arrangements, a priority can be established with respect to the set of scene markers 113. For instance, the priority can include sequentially ranking the set of scene markers 113. Alternatively, the priority can include assigning a priority level to the set of scene markers 113. For instance, the priority levels can include high, medium, and/or low. The ranking can be configured by a user or some other entity.

The vehicle 100 can include an autonomous driving module 120. The autonomous driving module 120 can be implemented as computer readable program code that, when executed by a processor, implement various processes described herein, including, for example, determining a travel route, implementing the determined travel route, determining a modification to a current driving maneuver of the vehicle 100 and/or causing, directly or indirectly, a current driving maneuver of the vehicle 100 to be modified. The autonomous driving module 120 can be a component of the processor 110, or the autonomous driving module 120 can be executed on and/or distributed among other processing systems to which the processor 110 is operatively connected.

The autonomous driving module 120 can include instructions (e.g., program logic) executable by the processor 110. Such instructions can include instructions to execute various vehicle functions and/or to transmit data to, receive data from, interact with, and/or control the vehicle 100 or one or more systems thereof (e.g. one or more of vehicle systems 145). Alternatively or in addition, the data store 115 may contain such instructions.

As noted above, the vehicle 100 can include a sensor system 125. The sensor system 125 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 125 includes a plurality of sensors, the sensors can work independently from each other. Alternatively, two or more of the sensors can work in combination with each other. In such case, the two or more sensors can form a sensor network. The sensor system 125 and/or the one or more sensors can be operatively connected to the processor 110, the data store 115, the autonomous driving module 120 and/or other element of the vehicle 100 and/or the autonomous driving system.

The sensor system 125 can include any suitable type of sensor. For example, the sensor system 125 can include one or more sensors configured to detect, determine, assess, monitor, measure, quantify and/or sense information about the vehicle 100. Alternatively or in addition, the sensor system 125 can include one or more sensors configured to detect, determine, assess, monitor, measure, quantify and/or sense information about the external environment in which the vehicle 100 is located, including information about objects in the external environment. Such objects may be stationary object or moving objects. Alternatively or in addition to one or more of the above examples, the sensor system 125 can include one or more sensors configured to detect, determine, assess, monitor, measure, quantify and/or sense the location of the vehicle 100 and/or the location of objects in the environment relative to the vehicle 100. Various examples of these and other types of sensors will be described herein. It will be understood that the embodiments are not limited to the particular sensors described.

The sensor system 125 can include one or more sensors configured to detect, determine, assess, monitor, measure, quantify and/or sense position and orientation changes of the vehicle 100, such as, for example, based on inertial acceleration. In one or more arrangements, the sensor system 125 can include accelerometers, gyroscopes and/or other suitable sensors. The sensor system 125 can include sensors that can monitor one or more internal systems of the vehicle 100 (e.g., an 02 monitor, a fuel gauge, an engine oil temperature, coolant temperature, etc.).

The sensor system 125 can include one or more environment sensors 126. The environment sensors 126 can be configured to detect, determine, assess, monitor, measure, quantify and/or sense objects in at least a portion of the external environment of the vehicle 100 and/or information/data about such objects. Various examples of the environment sensors 126 will be described herein. However, it will be understood that the embodiments are not limited to the particular sensors described.

In one or more arrangements, one or more of the environment sensors 126 can use at least in part radio signals (e.g. RADAR based sensors). The one or more radio-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the speed of each detected object and/or the movement of each detected object.

In one or more arrangements, one or more of the environment sensors 126 can use at least in part lasers. For instance, one or more of the environment sensors 126 can be or included as part of a laser rangefinder or a LIDAR. Such devices can include a laser source and/or laser scanner configured to emit a laser and a detector configured to detect reflections of the laser. The laser rangefinder or LIDAR may be configured to operate in a coherent or an incoherent detection mode. The one or more laser-based sensors can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the speed of each detected object and/or the movement of each detected object.

In one or more arrangements, one or more of the environment sensors 126 can use at least in part ultrasound. Such sensors can include an ultrasound source configured to emit ultrasonic signals and a detector configured to detect reflections of the ultrasonic signal. The one or more ultrasound-based environment sensors 126 can be configured to detect, determine, assess, monitor, measure, quantify and/or sense, directly or indirectly, the presence of one or more objects in the external environment of the vehicle 100, the position of each detected object relative to the vehicle 100, the distance between each detected object and the vehicle 100 in one or more directions (e.g. in the longitudinal direction 104, the lateral direction 106 and/or other direction(s)), the speed of each detected object and/or the movement of each detected object. Such detecting can be based on a characteristic (e.g. the intensity) of a reflected ultrasonic signal.

In one or more arrangements, the sensor system 125 can include one or more cameras. In one or more arrangements, the one or more cameras can be a part of the one or more environment sensors 126. "Camera" is defined as any device, component, and/or system that can capture at least visual data. "Visual data" can include video and/or image information/data. The visual data can be in any suitable form.

In one or more arrangements, one or more of the cameras can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, a linear array sensor. The image capture element may capture images in any suitable wavelength on the electromagnetic spectrum. The image capture element may capture color images and/or grayscale images. One or more of the cameras can be configured with zoom in and/or zoom out capabilities.

The one or more cameras can be oriented, positioned, configured, operable, and/or arranged to capture data from at least a portion of the external environment of the vehicle 100. The one or more cameras can be located in any suitable portion of the vehicle 100. For instance, one or more of the cameras can be located within the vehicle 100. One or more of the cameras can be located on the exterior of the vehicle 100. One or more of the cameras can be located on or exposed to the exterior of the vehicle 100.

The position of one or more of the cameras can be fixed such that its position does not change relative to the vehicle 100. One or more of the cameras can be movable so that its position can change to allow data from different portions of the external environment of the vehicle 100 to be captured. The movement of such cameras can be achieved in any suitable manner.

Alternatively or in addition to any of the sensors described above, the sensor system 125 can include other types of sensors. The sensor system 125, the processor 110 and/or one or more of the modules 120, 135, 137 can be operable to control movements or other aspects of one or more of the sensors and/or cameras of the sensor system 125. It should be noted that any of the sensors and/or cameras described herein can be provided in any suitable location with respect to the vehicle 100. For instance, one or more sensors and/or one or more cameras can be located within the vehicle 100. Alternatively or in addition, one or more sensors and/or one or more cameras can be located on the exterior of the vehicle 100. Still alternatively or in addition, one or more sensors and/or one or more cameras can be located so as to be exposed to the exterior of the vehicle 100.

In some arrangements, the sensor system 125, the processor 110, and/or one or more of the modules described herein 120, 135, 137 can be configured to detect, determine, assess, monitor, measure, quantify and/or sense, directly or indirectly, one or more aspects, characteristics and/or properties of a detected object. For example, the sensor system 125, the processor 110, and/or one or more of the modules 120, 135, 137 can be configured to detect, determine, assess, monitor, measure, quantify and/or sense, directly or indirectly, the size, relative size, length, width, height, a dimension, the material, a material property, the speed, the acceleration and/or the trajectory of a detected object. In one or more arrangements, one or more artificial or computational algorithms or machine learning methods can be used for such purposes.

The sensor system 125 can be configured to capture location information for objects within the environment surrounding the vehicle 100 for use by the processor 110, and/or one or more of the modules described herein 120, 135, 137 to estimate position and orientation of the vehicle 100, images for processing by an image sensor, vehicle position in global coordinates based on signals from a plurality of satellites, or any other data and/or signals that could be used to determine the current state of the vehicle 100 or determine the position of the vehicle 100 in respect to its environment for use in either creating a map format or determining the vehicle's 100 position in respect to the map format.

Map formats can be constructed using location-based geographic features captured by the vehicle 100 for road-based objects such as traffic lights, traffic signs, lane lines, crosswalks, and curbs proximate to the vehicle 100 as it travels along a travel route. Information representing these geographic features can be captured using the above described sensor system 125 in combination with an algorithm such as a random sample consensus (RANSAC) to differentiate lines, record the position of the vehicle 100, and collect data on position from a GNSS and/or an IMU. The captured information for these geographic features can then be manipulated using a simultaneous localization and mapping (SLAM) technique to position all of the geographic features in relation to the position of the vehicle 100.

Alternatively, map formats can be constructed using overhead images (e.g. satellite images) of geographic features traced by a map editor that allows selection of different categories for each geographic feature, for example, traffic sign, road marking, etc. Any map format used by the vehicle 100 can be stored, for example, in the data stores 115. A background map format can be constructed using location information for geographic features that are able to be ignored during moving object detection and tracking processes performed by the vehicle 100 for decision making while traveling a planned vehicle path. This group of geographic features, that is, background objects, can include stationary road-based objects, or road features, such as traffic signs, guardrails, berms, etc., and mostly stationary natural objects such as trees, shrubs, or bushes that can produce foliage.

The vehicle 100 can include an input system 130. An "input system" is defined as any device, component, system, element or arrangement or groups thereof that enable information/data to be entered into a machine. The input system 130 can receive an input from a vehicle occupant (e.g. a driver or a passenger). Any suitable input system 130 can be used, including, for example, a keypad, display, touch screen, multi-touch screen, button, joystick, mouse, trackball, microphone and/or combinations thereof.

The vehicle 100 can include an output system 131. An "output system" is defined as any device, component, system, element or arrangement or groups thereof that enable information/data to be presented to a vehicle occupant (e.g. a person, a vehicle occupant, etc.). The output system 131 can present information/data to a vehicle occupant. The output system 131 can include a display 300. "Display" is defined as a component or a group of components that present data in a form that is perceptible to the human sense of sight. The display 300 can be any suitable type of display. For instance, the display 300 can be a liquid crystal display (LCD), a light emitting diode (LED) display or some other suitable display.

Alternatively or in addition, the output system 131 may include one or more microphones, one or more earphones and/or one or more speakers 191. "Speaker" means one or more elements, one or more devices, one or more components, one or more systems, and/or any combination thereof that produce sound in response to an audio signal input. Examples of speakers include, for example, electroacoustic transducers, sound chips, and sound cards. Each speaker 191 can have one or more audio output channels (not shown) operatively connected thereto. "Audio output channel" means any suitable device, component or structure for carrying audio signals. Some components of the vehicle 100 may serve as both a component of the input system 130 and a component of the output system 131.

The vehicle 100 can include a transition event detection module 135. The transition event detection module 135 can be implemented as computer readable program code that, when executed by a processor, implement the various processes described herein. The transition event detection module 135 can be a component of the processor 110, or the transition event detection module 135 can be executed on and/or distributed among other processing systems to which the processor 110 is operatively connected. The transition event detection module 135 can be operatively connected to the map data 111, the set of driving scenes 112, and/or the scene markers 113.

The transition event detection module 135 can be configured to determine whether a transition event has occurred to warrant potentially switching the current operational mode of the vehicle 100 to a different operational mode. Such an event may be indicative of a problem which is to be communicated to the driver to prepare to take a greater degree of involvement in the vehicle control. The transition event detection module 135, the autonomous driving module 120, and/or the processor 110 can be configured to analyze data obtained, captured, and/or acquired by the sensor system 125 to identify one or more objects in the external environment. In some arrangements, one or more of these elements can be configured to identify the nature of the objects using any suitable technique, including, for example, template matching, computer vision and/or image processing techniques and/or other artificial or computational intelligence algorithms or machine learning methods.

The transition event detection module 135 can determine whether a transition event has occurred in any suitable manner. For instance, in one or more arrangements, visual or other data can be captured of the external environment of the vehicle 100, such as by the sensor system 125. The captured data can be compared to the map data 111 to determine whether the captured data matches the map data 111. In this context, "match" or "matches" means that the captured data and the predetermined data (e.g., the map data 111) are identical. In some embodiments, "match" or "matches" can also mean that the captured data and the predetermined data map data are substantially identical. For instance, the captured data and the predetermined data can match within a predetermined probability (e.g., at least about 85%, at least about 90%, at least about 95% or greater) or confidence level.

If there is a sufficient mismatch between the captured data and the map data 111 or they otherwise do not match, it can be determined that an operational mode transition event has occurred. For instance, a sufficient mismatch can occur if there is a construction zone or if the road has been repainted. When highly detailed map data 111 is used, even relatively minor deviations from the map data 111 can result in a determination that an operational mode transition event has occurred.

As another example, in one or more arrangements, one or more driving scenes can be captured along a travel route. The captured one or more driving scenes can be compared to the set of driving scenes 112. An operational mode transition event can be determined to have occurred when there is a sufficient mismatch between the captured one or more driving scenes and the predetermined set of driving scenes.

In one or more arrangements, the captured one or more driving scenes can be analyzed to determine whether one or more scene markers 113 are included in the captured driving scene(s). If one or more scene markers of the set of scene markers 113 are not included in the captured one or more driving scenes, then a sufficient mismatch can be determined to have occurred.

In some instances, the scene markers 113 can be ranked. For instance, one or more of the scene markers 113 can be assigned a high priority. A sufficient mismatch can occur when one or more high priority scene markers is not detected in the captured one or more driving scenes.

The sensor system 125 of the vehicle 100 can sense the external environment of the vehicle 100. The sensor system 125 may detect various features in the external environment (e.g., lane markings, landmarks such as signs, poles, intersections, etc.). These detected features can be matched with the set of scene markers 113. If the transition event detection module 135 determines a sufficient mismatch (e.g., few of observed features match their corresponding high-priority descriptors), then it can be determined that an operational mode transition event has occurred.

The vehicle 100 can include a time buffer determination module 137. The time buffer determination module 137 can be implemented as computer readable program code that, when executed by a processor, implement the various processes described herein. The time buffer determination module 137 can be a component of the processor 110, or the time buffer determination module 137 can be executed on and/or distributed among other processing systems to which the processor 110 is operatively connected.

The time buffer determination module 137 can be configured to determine a time buffer. As used herein, "time buffer" means an amount of time before the current operational mode of a vehicle is switched and/or is potentially switched to a different operational mode.

The time buffer can be determined in any suitable manner. For example, in one or more arrangements, the time buffer can be based at least partially on a characteristic of a current driving environment of the vehicle. For instance, if the current driving environment is more complex (e.g., a large number of detected objects, objects moving in a large number of different directions, roads that are not well-marked, nighttime, fog, rain, etc.), then it can be determined that a shorter time buffer is allowed. In contrast, if the current driving environment is less complex (e.g., a small number of detected objects, objects moving in a small number of different directions, well-marked roads, daytime, etc.), then it can be determined that a longer time buffer is allowed.

In one or more arrangements, the time buffer can be based at least partially on the amount of mismatch between the captured one or more driving scenes and the predetermined set of driving scenes and/or the predetermined set of scene markers. For instance, if there is a large degree of mismatch between the captured one or more driving scenes and the predetermined set of driving scenes and/or the predetermined set of scene markers, then it can be determined that a shorter time buffer is allowed. If there is a small degree of mismatch between the captured one or more driving scenes and the predetermined set of driving scenes and/or the predetermined set of scene markers, then it can be determined that a longer time buffer is allowed.

In one or more arrangements, the time buffer can be based at least partially on whether a high priority scene marker is present in the captured one or more driving scenes. If an expected high priority scene marker is not detected in the captured one or more driving scenes, then it can be determined that a shorter time buffer is allowed. If a high priority scene marker is detected, then it can be determined that a longer time buffer is allowed.

The vehicle 100 can include one or more vehicle systems 145. Various examples of the one or more vehicle systems 145 are shown in FIG. 1. However, the vehicle 100 can include more, fewer or different systems. It should be appreciated that although particular vehicle systems are separately defined, each or any of the systems or portions thereof may be otherwise combined or segregated via hardware and/or software within the vehicle 100.

The vehicle 100 can include a propulsion system 150. The propulsion system 150 can include one or more mechanisms, devices, elements, components, systems, and/or combinations thereof, now known or later developed, configured to provide powered motion for the vehicle 100. The propulsion system 150 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 100.

The vehicle 100 can include wheels, tires and/or tracks. Any suitable type of wheels, tires and/or tracks can be used. In one or more arrangements, the wheels, tires and/or tracks of the vehicle 100 can be configured to rotate differentially with respect to other wheels, tires and/or tracks of the vehicle 100. The wheels, tires and/or tracks can be made of any suitable material.

The vehicle 100 can include a braking system 155. The braking system 155 can include one or more mechanisms, devices, elements, components, systems, and/or combinations thereof, now known or later developed, configured to decelerate the vehicle 100. As an example, the braking system 155 can use friction to slow the wheels/tires. The braking system 155 can convert the kinetic energy of the wheels/tires to electric current.

Further, the vehicle 100 can include a steering system 160. The steering system 160 can include one or more mechanisms, devices, elements, components, systems, and/or combinations thereof, now known or later developed, configured to adjust the heading of the vehicle 100.

The vehicle 100 can include a throttle system 165. The throttle system 165 can include one or more mechanisms, devices, elements, components, systems, and/or combinations thereof, now known or later developed, configured to control the operating speed of an engine/motor of the vehicle 100 and, in turn, the speed of the vehicle 100.

The vehicle 100 can include a transmission system 170. The transmission system 170 can include one or more mechanisms, devices, elements, components, systems, and/or combinations thereof, now known or later developed, configured to transmit mechanical power from the engine/motor of the vehicle 100 to the wheels/tires. For instance, the transmission system 170 can include a gearbox, clutch, differential, drive shafts, and/or other elements. In arrangements where the transmission system 170 includes drive shafts, the drive shafts can include one or more axles that are configured to be coupled to the wheels/tires.

The vehicle 100 can include a signaling system 175. The signaling system 175 can include one or more mechanisms, devices, elements, components, systems, and/or combinations thereof, now known or later developed, configured to provide illumination for the driver of the vehicle 100 and/or to provide information with respect to one or more aspects of the vehicle 100. For instance, the signaling system 175 can provide information regarding the vehicle's presence, position, size, direction of travel, and/or the driver's intentions regarding direction and speed of travel. For instance, the signaling system 175 can include headlights, taillights, brake lights, hazard lights and turn signal lights.

The vehicle 100 can include a navigation system 180. The navigation system 180 can include one or more mechanisms, devices, elements, components, systems, applications and/or combinations thereof, now known or later developed, configured to determine the geographic location of the vehicle 100 and/or to determine a travel route for the vehicle 100.

The navigation system 180 can include one or more mapping applications to determine a travel route for the vehicle 100. For instance, a driver or passenger may input an origin and a destination. The mapping application can determine one or more suitable travel routes between the origin and the destination. A travel route may be selected based on one or more parameters (e.g. shortest travel distance, shortest amount of travel time, etc.). In some arrangements, the navigation system 180 can be configured to update the travel route dynamically while the vehicle 100 is in operation.

The navigation system 180 can include a global positioning system, a local positioning system or a geolocation system. The navigation system 180 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 180 can use Transmission Control Protocol (TCP) and/or a Geographic information system (GIS) and location services.

The navigation system 180 may include a transceiver configured to estimate a position of the vehicle 100 with respect to the Earth. For example, navigation system 180 can include a GPS transceiver to determine the vehicle's latitude, longitude and/or altitude. The navigation system 180 can use other systems (e.g. laser-based localization systems, inertial-aided GPS, and/or camera-based localization) to determine the location of the vehicle 100.

Alternatively or in addition, the navigation system 180 can be based on access point geolocation services, such as using the W3C Geolocation Application Programming Interface (API). With such a system, the location of the vehicle 100 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 100 is determined will depend on the manner of operation of the particular location tracking system used.

The processor 110 and/or the autonomous driving module 120 can be operatively connected to communicate with the various vehicle systems 145 and/or individual components thereof. For example, returning to FIG. 1, the processor 110 and/or the autonomous driving module 120 can be in communication to send and/or receive information from the various vehicle systems 145 to control the movement, speed, maneuvering, heading, direction, etc. of vehicle 100. The processor 110 and/or the autonomous driving module 120 may control some or all of these vehicle systems 145 and, thus, may be partially or fully autonomous.

The processor 110 and/or the autonomous driving module 120 may be operable to control the navigation and/or maneuvering of the vehicle 100 by controlling one or more of the vehicle systems 145 and/or components thereof. For instance, when operating in an autonomous mode, the processor 110 and/or the autonomous driving module 120 can control the direction and/or speed of the vehicle 100. The processor 110 and/or the autonomous driving module 120 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 140. The actuators 140 can be any element or combination of elements operable to modify, adjust and/or alter one or more of the vehicle systems 145 or components thereof to responsive to receiving signals or other inputs from the processor 110 and/or the autonomous driving module 120. Any suitable actuator can be used. For instance, the one or more actuators 140 can include motors, pneumatic actuators, hydraulic pistons, relays, solenoids, and/or piezoelectric actuators, just to name a few possibilities.

The vehicle 100 can include a perception system (not shown). The perception system can capture data and/or signals for processing by an inertial measurement unit (IMU), a dead-reckoning system, a global navigation satellite system (GNSS), a light detection and ranging (LIDAR) system, a radar system, a sonar system, an image-based sensor system, or any other type of system capable of capturing information specific to the environment surrounding a vehicle for use in creating a background map format, including information specific to both stationary and moving objects such as traffic signs, natural objects, moving vehicles, pedestrians, or other localized position data and/or signals, and outputting corresponding data and/or signals to the processor 110. The perception system can determine vehicle position and velocity data. The perception system can determine the location of obstacles, objects, or other environmental features including traffic signs, trees, shrubs, neighboring vehicles, pedestrians, etc. One or more vehicle systems 145 can be operatively connected to the perception system. The perception system can be configured to capture data indicative of performance of the vehicle systems 145.

According to arrangements herein, the vehicle 100 can be configured to provide a vehicle occupant (e.g., the driver) with a running indication of the amount of time remaining before the vehicle 100 potentially switches to a different operational mode, particularly one that has a greater degree of manual involvement. Such an indication can be provided by a transition alert. The transition alert can be output within the vehicle 100.

The transition alert can have any suitable form. For instance, the transition alert can be a visual transition alert, an audial transition alert, a haptic transition alert, and/or combinations thereof. "Visual transition alert" is any communication that is perceptible to the human sense of sight. "Audial transition alert" is any communication that is perceptible to the human sense of hearing. "Haptic transition alert" is any communication that is perceptible to the human sense of touch. Various non-limiting examples of such transition alerts will now be provided.

Figure 3:
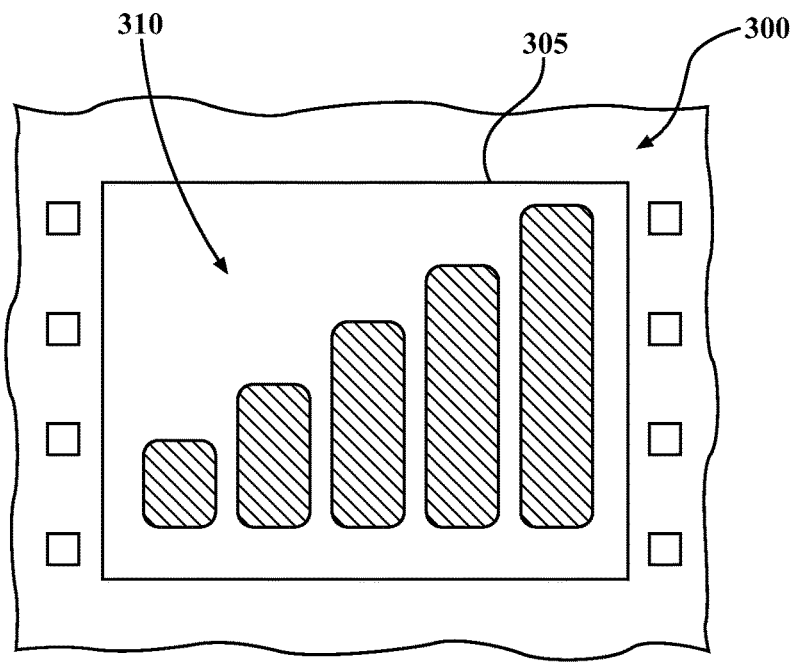
FIG. 3 is an example of a transition alert presented on a display, wherein the transition alert is a bar graph.

The visual transition alert can be presented to the vehicle occupant (e.g., the driver) using the output system 131. For instance, the visual transition alert can be presented on one or more of displays 300 (see FIGS. 3 and 4). The display 300 can include a screen 305, which can be a touch screen or a multi-touch screen. The visual transition alert can have any suitable form. In one or more arrangements, the visual transition alert can be a bar graph 310 (see FIG. 3). The bars can be substantially identical to each other, or one or more of the bars can be different from the other bars. FIG. 3 shows an example in which the length of the bars gets progressively larger in going from left to right. However, arrangements described herein are not limited to this type of bar graph.

The bars of the bar graph 310 can be selectively illuminated based on the determined time buffer. In one or more arrangements, more of the bars can be selectively illuminated when the time buffer is short, and fewer of the bars can be selectively illuminated when the time buffer is long. In one or more alternative arrangements, more of the bars can be selectively illuminated when the time buffer is long, and fewer of the bars can be selectively illuminated when the time buffer is short.

Figure 4:
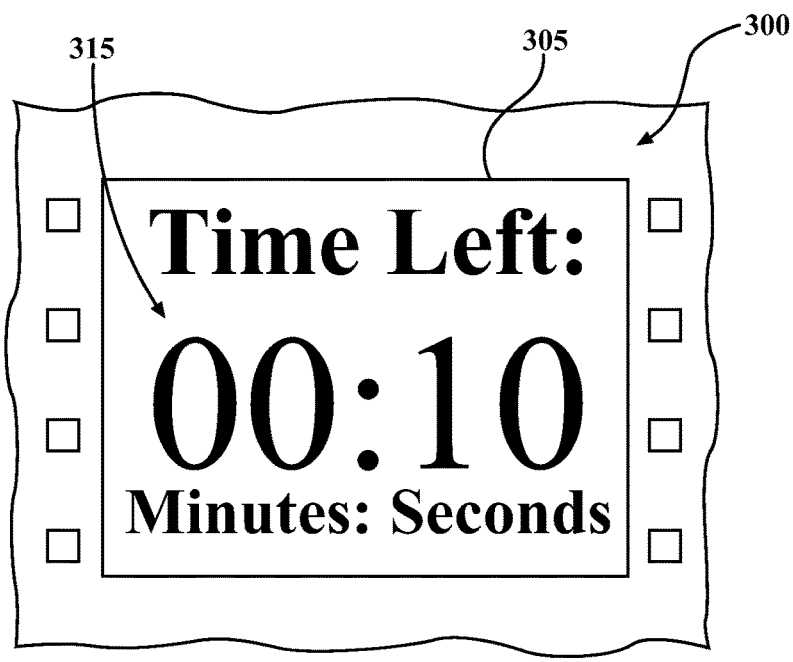
FIG. 4 is another example of a transition alert presented on a display, wherein the transition alert is a countdown clock.

In one or more arrangements, the visual transition alert can be a countdown clock 315 (see FIG. 4). The countdown clock 315 can display the time remaining until the current operational mode will be potentially switched to a different operational mode.

Alternatively or in addition, the visual transition alert can be presented by one or more light sources (not shown). The one or more light sources can generate or emit any type of light energy. In one or more arrangements, the one or more light sources can be electric-powered. In one or more arrangements, the one or more light sources can include one or more of the following types of electric-powered light sources: electron-stimulated, incandescent lamps, electroluminescent (EL) lamps, gas discharge lamps, high-intensity discharge lamps and/or lasers, just to name a few possibilities. In one or more arrangements, the one or more light sources can be light emitting diodes (LEDs). For instance, the one or more light sources can be organic LEDs, polymer LEDs, solid state lighting, LED lamps, and/or active-matrix organic LEDs. In some arrangements, the one or more light sources can be the same type of light source. In other arrangements, one or more of the one or more light sources can be a different type of light source than the other light sources.

In the case of a single light source, the light can be initially activated when a transition event is determined. The light source may be a first color (e.g., green). The color can change depending on the time buffer. For example, as the time buffer gets smaller, the color can change to a second color (e.g., yellow) and then possibly to a third color (e.g., red) as the time buffer has nearly expired. In some instances, the light source can also blink on and off to draw further attention to it. Such blinking can occur at any suitable time and/or at any suitable blinking frequency.

In the case of a plurality of light sources, one light source can be initially activated when an operational mode transition event is determined. Additional light sources can be activated as the time buffer gets smaller. Also, the color of the light sources can change as the time buffer gets smaller. For instance, the activated light sources may initially be green and change to yellow and then to red as the time buffer gets smaller. In one or more arrangements, the all of the plurality of light sources can be initially activated when a transition event is determined. As the time buffer gets smaller, the number of activated light sources can decrease in any suitable sequence until only one or no light sources are activated when the time buffer is at or close to zero.

The audial transition alert can be presented to the vehicle occupant (e.g., the driver) using the output system 131. For instance, the audial transition alert can be presented on one or more of speakers 191. The audial transition alert can have any suitable form. For instance, the audial transition alert can be a sound and/or a message (e.g., word(s), phrase(s), and/or sentence(s)). As an example, the audial transition alert can indicate: "X seconds to take over", "prepare to take control", etc.

The haptic transition alert can be presented to the vehicle occupant (e.g., the driver) using the any suitable element. For instance, the vehicle 100 (or the output system 131 of the vehicle 100) can include one or more haptic actuators 192 to cause a haptic transition alert to be presented. The haptic actuator(s) 192 can be any element or combination of elements operable to modify, adjust and/or alter one or more elements of the vehicle 100 to responsive to receiving signals or other inputs from the processor 110 and/or the autonomous driving module 120. Any suitable haptic actuator can be used. For instance, the one or more haptic actuators 192 can include motors, pneumatic actuators, hydraulic pistons, relays, solenoids, and/or piezoelectric actuators, just to name a few possibilities.

The haptic transition alert can have any suitable form. For instance, the haptic transition alert can be presented by causing a vibration of the driver's seat. However, it will be understood that the haptic transition alerts are not limited to vibrations. It will also be understood that the haptic transition alert is not limited to being presented by the driver's seat.

It will be appreciated that any combination of the above types of transition alerts and/or other types of transition alerts can be provided. For instance, a visual transition alert and an audial transition alert can be used in combination in any suitable manner.

It should be noted that the transition alert can have one or more output characteristics. According to arrangements herein, an output characteristic of the transition alert can be varied responsive to changes in the determined time buffer. Thus, as the time buffer gets shorter, the output characteristic can be varied to draw a driver's attention. Any suitable variation to the output characteristic can be made when the time buffer gets shorter. For example, in the case of a visual transition alert, the visual transition alert can be varied with respect to the size (e.g. larger or more lights or bars illuminated), color (e.g., a warning color such as red), brightness (e.g., increase in brightness), and/or mode (e.g., flashing or flashing at an increased frequency), just to name a few possibilities. With respect to an audial transition alert, the transition alert can be varied with respect to the sound level (e.g., louder) and/or the frequency of the sound (e.g., more frequent), just to name a few possibilities. With respect to a haptic transition alert, the transition alert can be varied with respect to the haptic strength (e.g. stronger) and/or frequency (e.g., more frequent).

The speed at which the output characteristic(s) of the transition alert is varied can be a function of the condition causing the transition event (e.g., the amount of variance between an expected driving scene/scene marker and the actual driving scene/scene marker) and/or the current driving environment. Thus, as the variance between an expected driving scene/scene marker and the actual driving scene/scene marker increases, the more rapidly the output characteristic(s) of the transition alert will be varied. Alternatively or in addition, the more complex the current driving environment, the more rapidly the output characteristic(s) of the transition alert will be varied. For instance, if there are objects or obstacles detected around the vehicle 100, the speed at which the one or more output characteristics of the transition alert are varied can be increased to warn the driver more quickly. However, if there are no obstacles or objects near the vehicle 100, then the speed at which the one or more output characteristics of the transition alert are varied can remain the same, in a default setting, or even decreased.

Of course, as the time buffer gets longer, the output characteristic can be varied to reduce the amount of attention drawn to the transition alert. Any suitable variation to the output characteristic can be made when the time buffer gets longer. Examples of such variations can include the opposition of those described above.

Figure 2:
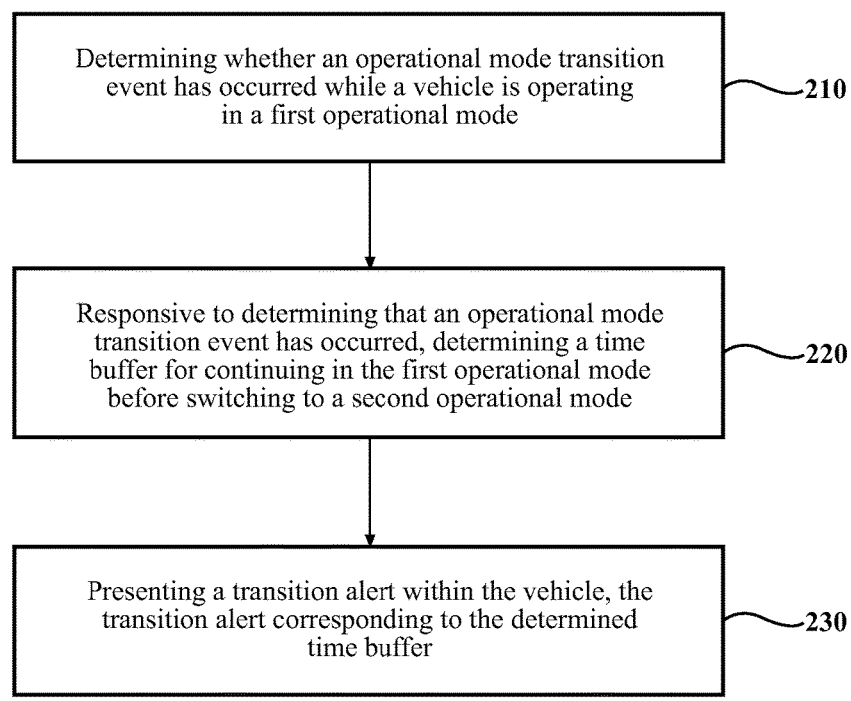
FIG. 2 is an example of a method of transitioning a vehicle between a first operational mode and a second operational mode, wherein the second operational mode has a greater degree of manual involvement than the first operational mode.

Now that the various potential systems, devices, elements and/or components of the vehicle 100 have been described, various methods of detecting stationary objects at long distances in an external environment of an autonomous vehicle will now be described. Referring now to FIG. 2, an example of a method of transitioning a vehicle between a first operational mode and a second operational mode is shown. The first operational mode is different from the second operational mode. The method 200 will be described in connection with instances in which the second operational mode has a greater degree of manual involvement than the first operational mode. However, it will be understood that arrangements described herein are not limited in this respect. Indeed, in one or more arrangements, the method 200 can be implemented in instances in which the second operational mode has a lesser degree of manual involvement that the first operational mode.

Various possible steps of method 200 will now be described. The method 200 illustrated in FIG. 2 may be applicable to the embodiments described above in relation to FIG. 1, but it is understood that the method 200 can be carried out with other suitable systems and arrangements. Moreover, the method 200 may include other steps that are not shown here, and in fact, the method 200 is not limited to including every step shown in FIG. 2. The steps that are illustrated here as part of the method 200 are not limited to this particular chronological order. Indeed, some of the steps may be performed in a different order than what is shown and/or at least some of the steps shown can occur simultaneously.

At block 210, it can be determined whether an operational mode transition event has occurred while the vehicle is operating in the first operational mode. Such a determination can be made by the transition event detection module 135. Such a determination can be made continuously, periodically, irregularly, or even randomly. Such a determination can be made in real-time. If an operational mode transition event is detected, the method 200 can continue to block 220. If an operational mode transition event is not detected, the method 200 can end, or the method 200 can return to block 210.

At block 220, responsive to determining that an operational mode transition event has occurred, a time buffer for continuing in the first operational mode before switching to the second operational mode can be determined. Such a determination can be made by the time buffer determination module 137. Such a determination can be made continuously, periodically, irregularly, or even randomly. Thus, the determined time buffer can vary over time. In some instances, the time buffer can decrease. In other instances, the time buffer may increase. The determination of the time buffer can be made in real-time. The method 200 can continue to block 230.

At block 230, a transition alert can be presented within the vehicle 100. The transition alert can be presented in any suitable manner and in any suitable form (e.g., audial, visual, and/or haptic). The transition alert can be presented by the output system 131 (e.g., display(s) 300, speaker(s) 191, haptic actuator(s) 192, etc.). The transition alert can correspond to the determined time buffer. Thus, the transition alert can be updated as the determined time buffer is updated. The transition alert can be varied to indicate the importance and/or urgency to the driver of the vehicle 100.

The method 200 can end. Alternatively, the method 200 can return to block 210. As a further alternative, the method 200 can include additional and/or alternative blocks (not shown). For instance, in one or more arrangements, the method 200 can include detecting whether a vehicle occupant has provided an indication of increased manual involvement (e.g., a degree of manual involvement commensurate with the second operational mode). The occupant input can be received in any suitable manner. For instance, a vehicle occupant can provide an input using one or more components of the input system 130. As an example, a vehicle occupant can provide an input through a touch screen, button, switch or other in vehicle user interface element. In some arrangements, a vehicle occupant can provide an input through engagement with one or more vehicle components (e.g. gripping or turning the steering wheel, activating a turn signal, engaging a brake pedal, engaging a gas pedal, etc.). In one or more arrangements, a vehicle occupant can provide an input by speaking.

Responsive to detecting that a user has provided such an indication, the vehicle 100 can be caused to switch from the first operational mode to the second operational mode. Such switching can be performed by the processor 110, the autonomous driving module 120, and or the actuators 140. Responsive to detecting that a user has not provided such an indication (e.g., the driver is asleep, distracted, etc.), the vehicle can be caused to switch from the current operational mode to the special operational mode. Such switching can be performed by the processor 110, the autonomous driving module 120, and or the actuators 140.

A non-limiting example of the method 200 will now be described. In this example, the vehicle 100 may be preparing to pass through an intersection. The vehicle 100 can be operating in an unmonitored autonomous operational mode. The transition event detection module 135 can determine that a transition event has or will occur due to the complexity of the intersection. In this example, the transition would be from the unmonitored autonomous operational mode to an operational mode with a greater degree of manual involvement (e.g., a monitored autonomous operational mode or a manual mode).

The transition event detection module 135 and/or the time buffer determination module 137 may, as a default option, present a transition alert as soon as it is detected that the vehicle is within a predetermined distance to the intersection. For purposes of this example, the transition alert can be a visual transition alert. For instance, the transition alert can be a single light source. The light source can be illuminated a first color (e.g., green).

While the vehicle is approaching the intersection, the vehicle 100 (e.g., the transition event detection module 135) should start detecting certain features (e.g., traffic lights or signs). These features can be compared to the set of scene markers 113. If there is a sufficient mismatch or deviation from what is expected, then a characteristic of an output of the visual transition alert can be varied. For instance, the light output from the light source can be changed to a second color (e.g., red). For instance, the vehicle 100 may not be able to detect traffic lights at the intersection, though it should be able to do so (e.g., because the traffic lights are not working). Alternatively or in addition, the vehicle 100 cannot detect an appropriate street name on the road sign (or detect an unexpected street name or an unexpected street sign) at the approaching intersection.

If there is little mismatch between the detected features and the scene markers 113 or if the vehicle 100 eventually detects a feature that it previously could not, then the light output from the light source can remain or return to the first color to indicate that no immediate transition from autonomous to manual mode is to be expected. The light source can be supplemented with the display of a countdown clock while the vehicle 100 is approaching the intersection since the predicted time buffer is a convenient measure for the driver as to when driver intervention is expected.

It will be appreciated that arrangements described herein can provide numerous benefits, including one or more of the benefits mentioned herein. For example, arrangements described herein can improve the performance of an autonomous vehicle by providing for smooth transitioning between operational modes. Arrangements described herein can provide for enhanced communication between the vehicle and a human driver. Arrangements described herein can maximize the amount of time for the driver to increase the level of manual involvement in the operation of the vehicle. Arrangements described herein can improve safety for autonomous vehicles by alerting a human driver of deviations between expected driving scenes and actual driving scenes. Arrangements described herein can also improve safety by taking appropriate safety measures if a driver fails to confirm that he or she is ready to provide an increased level of manual involvement in the operation of the vehicle. Further, arrangements described herein can increase the overall confidence level of vehicle occupants in the autonomous vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of transitioning a vehicle between a first operational mode and a second operational mode, the second operational mode having a greater degree of manual involvement than the first operational mode, the method comprising:
   capturing, using one or more sensors located onboard the vehicle, one or more driving scenes along a travel route while the vehicle is operating in the first operational mode, the one or more driving scenes being of an external environment of the vehicle;
   comparing, using one or more processors, the captured one or more driving scenes to a predetermined set of driving scenes of the external environment of the vehicle;
   determining, using one or more processors, whether an operational mode transition event has occurred while the vehicle is operating in the first operational mode, the operational mode transition event being determined to have occurred at least when there is a sufficient mismatch between the captured one or more driving scenes and the predetermined set of driving scenes;
   responsive to determining that an operational mode transition event has occurred, determining, using one or more processors, a time buffer for continuing in the first operational mode before switching to the second operational mode; and
   presenting a transition alert within the vehicle, the transition alert corresponding to the determined time buffer.

2. The method of claim 1, wherein the time buffer is based at least partially on a characteristic of a current driving environment of the vehicle.

3. The method of claim 1, wherein presenting the transition alert within the vehicle includes varying an output characteristic of the transition alert responsive to changes in the determined time buffer.

4. A method of transitioning a vehicle between a first operational mode and a second operational mode, the second operational mode having a greater degree of manual involvement than the first operational mode, the method comprising:
   capturing, using one or more sensors located onboard the vehicle, one or more driving scenes along a travel route while the vehicle is operating in the first operational mode;
   comparing, using one or more processors, the captured one or more driving scenes to a predetermined set of driving scenes;
   determining, using one or more processors, whether an operational mode transition event has occurred while the vehicle is operating in the first operational mode, the operational mode transition event being determined to have occurred at least when there is a sufficient mismatch between the captured one or more driving scenes and the predetermined set of driving scenes;
   responsive to determining that an operational mode transition event has occurred, determining, using one or more processors, a time buffer for continuing in the first operational mode before switching to the second operational mode, wherein the time buffer is based at least partially on an amount of mismatch between the captured one or more driving scenes and the predetermined set of driving scenes; and
   presenting a transition alert within the vehicle, the transition alert corresponding to the determined time buffer.

5. The method of claim 1, wherein the predetermined set of driving scenes includes a set of scene markers.

6. A method of transitioning a vehicle between a first operational mode and a second operational mode, the second operational mode having a greater degree of manual involvement than the first operational mode, the method comprising:
   capturing, using one or more sensors located onboard the vehicle, one or more driving scenes along a travel route while the vehicle is operating in the first operational mode;
   comparing, using one or more processors, the captured one or more driving scenes to a predetermined set of driving scenes, the predetermined set of driving scenes including a set of scene markers, the set of scene markers being ranked, at least one of the scene markers included in the set of scene markers being assigned a high priority;

determining, using one or more processors, whether an operational mode transition event has occurred while the vehicle is operating in the first operational mode, the operational mode transition event being determined to have occurred at least when there is a sufficient mismatch between the captured one or more driving scenes and the predetermined set of driving scenes, wherein a sufficient mismatch occurs when a high priority scene marker is not present in the captured one or more driving scenes;

responsive to determining that an operational mode transition event has occurred, determining, using one or more processors, a time buffer for continuing in the first operational mode before switching to the second operational mode; and presenting a transition alert within the vehicle, the transition alert corresponding to the determined time buffer.

7. The method of claim 1, wherein the first operational mode is an unmonitored autonomous operational mode, and wherein the second operational mode is one of a monitored autonomous operational mode or a manual operational mode.

8. The method of claim 1, wherein the first operational mode is monitored autonomous operational mode, and wherein the second operational mode is a manual operational mode.

9. The method of claim 1, wherein the transition alert is a visual transition alert.

10. The method of claim 1, wherein the transition alert is an audial transition alert.

11. The method of claim 1, wherein the transition alert is a haptic transition alert.

12. The method of claim 1, further including:
detecting whether a vehicle occupant has provided an indication that the vehicle occupant is ready for the second operational mode; and
responsive to detecting that a user has provided an indication that the vehicle occupant is ready for the second operational mode, causing the vehicle to switch from the first operational mode to the second operational mode.

13. The method of claim 1, further including:
detecting whether a vehicle occupant has provided an indication that the vehicle occupant is ready for the second operational mode; and
responsive to detecting that a user has not provided an indication that the vehicle occupant is ready for the second operational mode, causing the vehicle to switch from the first operational mode to a special operational mode.

14. A system for transitioning a vehicle between a first operational mode and a second operational mode, the second operational mode having a greater degree of manual involvement than the first operational mode, the system comprising:
one or more sensors located onboard the vehicle, the one or more sensors operable to sense at least a portion of an external environment of the vehicle, the one or more sensors being configured to capture one or more driving scenes along a travel route while the vehicle is operating in the first operational mode, the one or more driving scenes being of an external environment of the vehicle;
a user interface located within the vehicle; and
one or more processors operatively connected to the user interface and to the one or more sensors, the one or more processors being programmed to initiate executable operations comprising:
comparing the captured one or more driving scenes to a predetermined set of driving scenes of the external environment of the vehicle;
determining whether an operational mode transition event has occurred while the vehicle is operating in the first operational mode, the operational mode transition event being determined to have occurred at least when there is a sufficient mismatch between the captured one or more driving scenes and the predetermined set of driving scenes;
responsive to determining that an operational mode transition event has occurred, determining a time buffer for continuing in the first operational mode before switching to the second operational mode; and
presenting a transition alert within the vehicle using the user interface, the transition alert corresponding to the determined time buffer.

15. The system of claim 14, wherein the time buffer is based at least partially on a characteristic of a current driving environment of the vehicle.

16. The system of claim 14, wherein presenting the transition alert within the vehicle includes varying an output characteristic of the transition alert responsive to changes in the determined time buffer.

17. The system of claim 14, wherein the first operational mode is an unmonitored autonomous operational mode, and wherein the second operational mode is one of a monitored autonomous operational mode or a manual operational mode.

18. The system of claim 14, wherein the user interface includes a display, wherein the transition alert is a visual transition alert, and wherein the transition alert is presented on the display.

19. The system of claim 14, wherein the user interface includes a speaker, wherein the transition alert is an audial transition alert, and wherein the transition alert is presented on the speaker.

20. The system of claim 14, wherein the user interface includes a haptic actuator, wherein the transition alert is a haptic transition alert, and wherein the transition alert is presented by the haptic actuator.

21. A system for transitioning a vehicle between a first operational mode and a second operational mode, the second operational mode having a greater degree of manual involvement than the first operational mode, the system comprising:
one or more sensors located onboard the vehicle, the one or more sensors operable to sense at least a portion of an external environment of the vehicle, the one or more sensors being configured to capture one or more driving scenes along a travel route while the vehicle is operating in the first operational mode, the one or more driving scenes being of an external environment of the vehicle;
a user interface located within the vehicle; and
one or more processors operatively connected to the user interface and to the one or more sensors, the one or more processors being programmed to initiate executable operations comprising:

comparing the captured one or more driving scenes to a predetermined set of driving scenes of the external environment of the vehicle;

determining whether an operational mode transition event has occurred while the vehicle is operating in the first operational mode, the operational mode transition event being determined to have occurred at least when there is a sufficient mismatch between the captured one or more driving scenes and the predetermined set of driving scenes;

responsive to determining that an operational mode transition event has occurred, determining a time buffer for continuing in the first operational mode before switching to the second operational mode, the time buffer being based at least partially on an amount of mismatch between the captured one or more driving scenes and the predetermined set of driving scenes; and presenting a transition alert within the vehicle using the user interface, the transition alert corresponding to the determined time buffer.

22. A system for transitioning a vehicle between a first operational mode and a second operational mode, the second operational mode having a greater degree of manual involvement than the first operational mode, the system comprising:

one or more sensors located onboard the vehicle, the one or more sensors operable to sense at least a portion of an external environment of the vehicle, the one or more sensors being configured to capture one or more driving scenes along a travel route while the vehicle is operating in the first operational mode;

a user interface located within the vehicle; and one or more processors operatively connected to the user interface and to the one or more sensors, the one or more processors being programmed to initiate executable operations comprising:

comparing the captured one or more driving scenes to a predetermined set of driving scenes, the predetermined set of driving scenes including a set of scene markers, the set of scene markers included in the set of scene markers being ranked, at least one of the scene markers being assigned a high priority;

determining whether an operational mode transition event has occurred while the vehicle is operating in the first operational mode, the operational mode transition event being determined to have occurred at least when there is a sufficient mismatch between the captured one or more driving scenes and the predetermined set of driving scenes, wherein a sufficient mismatch occurs when a high priority scene marker is not present in the captured one or more driving scenes;

responsive to determining that an operational mode transition event has occurred, determining a time buffer for continuing in the first operational mode before switching to the second operational mode; and presenting a transition alert within the vehicle using the user interface, the transition alert corresponding to the determined time buffer.

23. The system of claim 14, wherein the user interface includes at least one of a display, a light source, a speaker, or a haptic actuator.

* * * * *

UNITED STATES PATENT AND TRADEMARK OFFICE
CERTIFICATE OF CORRECTION

PATENT NO. : 9,884,631 B2
APPLICATION NO. : 14/730570
DATED : February 6, 2018
INVENTOR(S) : Michael R. James et al.

Page 1 of 1

It is certified that error appears in the above-identified patent and that said Letters Patent is hereby corrected as shown below:

In the Claims

Claim 1, Column 21, Line 67: delete "vehicle:" and insert --vehicle;--
Claim 1, Column 22, Line 4: delete "vehicle:" and insert --vehicle;--
Claim 14, Column 24, Line 11: delete "vehicle:" and insert --vehicle;--
Claim 22, Column 26, Lines 9-11: delete "the set of scene markers included in the set of scene markers being ranked, at least one of the scene markers being assigned a high priority;" and insert --the set of scene markers being ranked, at least one of the scene markers included in the set of scene markers being assigned a high priority;--

Signed and Sealed this
Tenth Day of April, 2018

Andrei Iancu
*Director of the United States Patent and Trademark Office*